United States Patent
Kotre et al.

(10) Patent No.: US 6,442,455 B1
(45) Date of Patent: Aug. 27, 2002

(54) ADAPTIVE FUEL STRATEGY FOR A HYBRID ELECTRIC VEHICLE

(75) Inventors: Stephen John Kotre, Ann Arbor, MI (US); Jerry D. Robichaux, Tucson, AZ (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/746,492

(22) Filed: Dec. 21, 2000

(51) Int. Cl.[7] .......................... B60L 11/00; B60L 11/02; G05D 1/00; G05D 1/02; G06F 7/00; G06F 17/00; G06F 19/00

(52) U.S. Cl. .............................. 701/22; 701/1; 701/86; 701/84; 701/85; 701/83; 701/109; 701/101; 701/102; 701/112; 701/103; 701/104; 123/179.16; 123/179.18; 123/195 G; 123/192.2; 123/198 F; 123/179.3; 123/673; 123/681; 123/674; 123/698; 123/575; 123/478; 180/65.2; 180/65.4; 180/65.8; 180/65.3; 290/16; 290/40 C; 322/16; 322/22

(58) Field of Search .............................. 701/22, 1, 109, 701/101, 108, 102, 112, 103, 104, 83, 84, 85, 86; 123/673, 672, 681, 674, 698, 679, 575, 478, 179.16, 179.18, 195 E, 192.2, 198 F, 179.3; 60/285, 276; 180/65.2, 65.4, 65.8, 65.3; 290/16, 40 C; 322/16, 23; 181/204

(56) References Cited

U.S. PATENT DOCUMENTS

| 5,343,970 | A | | 9/1994 | Severinsky |
| 5,464,000 | A | | 11/1995 | Pursifull et al. |
| 5,469,820 | A | * | 11/1995 | Data et al. ................ 123/192.2 |
| 5,606,946 | A | * | 3/1997 | Data et al. ................ 123/198 E |
| 5,820,172 | A | * | 10/1998 | Brigham et al. ........... 290/40 C |
| 6,054,844 | A | * | 4/2000 | Frank ............................ 322/16 |
| 6,116,363 | A | * | 9/2000 | Frank .......................... 180/65.2 |
| 6,161,531 | A | * | 12/2000 | Hamburg et al. ............ 123/674 |
| 6,173,703 | B1 | * | 1/2001 | Matsumoto ................... 123/674 |
| 6,182,647 | B1 | * | 2/2001 | Hori et al. ................... 123/674 |
| 6,195,988 | B1 | * | 3/2001 | Yasui et al. .................... 60/285 |
| 6,279,560 | B1 | * | 8/2001 | Mauro et al. ................. 123/674 |
| 6,298,838 | B1 | * | 10/2001 | Huff et al. ................... 123/674 |
| 6,298,840 | B1 | * | 10/2001 | Kerns .......................... 123/681 |
| 6,311,680 | B1 | * | 11/2001 | Bradley, Sr et al. ......... 123/672 |
| 6,314,952 | B1 | * | 11/2001 | Turin et al. .................. 123/673 |

\* cited by examiner

Primary Examiner—William A. Cuchlinski, Jr.
Assistant Examiner—Ronnie Mancho
(74) Attorney, Agent, or Firm—Carlos L. Hanze

(57) ABSTRACT

This invention is a method and system for a hybrid electric vehicle adaptive fuel strategy to quickly mature an adaptive fuel table. The strategy adaptively alters the amount of fuel delivered to an internal combustion engine to optimize engine efficiency and emissions using engine sensors. Before the adaptive fuel strategy is permitted, an engine "on" idle arbitration logic requires the HEV to be in idle conditions, with normal battery state of charge, normal vacuum in the climate control and brake system reservoir; and, the vapor canister not needing purging. The strategy orders the engine throttle to sweep different airflow regions of the engine to adapt cells within the adaptive fuel table. In the preferred configuration, a generator attached to the vehicle drive train, adds and subtracts torque to maintain constant engine speed during the throttle sweeps.

17 Claims, 4 Drawing Sheets

| Adaptive Fuel Table 92 | | |
|---|---|---|
| 6 | 6.0 lbs/min | xxx |
| 5 | 5.0 lbs/min | xxx |
| 4 | 4.0 lbs/min | xxx |
| 3 | 3.0 lbs/min | xxx |
| 2 | 2.0 lbs/min | xxx |
| 1 | 1.0 lbs/min | xxx |
| ADAPT_CELL_PTR | Corresponding Airflow | Fuel Shift Learned |

*Fig-4*

ADAPTIVE FUEL STRATEGY FOR A HYBRID ELECTRIC VEHICLE

BACKGROUND OF THE INVENTION

1. Field of the Invention

The present invention relates generally to a Hybrid Electric Vehicle (HEV), and specifically to a method and system to optimize emissions using an adaptive fuel strategy for a hybrid electric vehicle (HEV).

2. Discussion of the Prior Art

The need to reduce fossil fuel consumption and emissions in automobiles and other vehicles predominately powered by Internal Combustion Engines (ICEs) is well known. Vehicles powered by electric motors attempt to address these needs.

Another alternative solution is to combine a smaller ICE with electric motors into one vehicle. Such vehicles combine the advantages of an ICE vehicle and an electric vehicle and are typically called Hybrid Electric Vehicles (HEVs). See generally, U.S. Pat. No. 5,343,970 to Severinsky.

The HEV is described in a variety of configurations. Many HEV patents disclose systems where an operator is required to select between electric and internal combustion operation. In other configurations, the electric motor drives one set of wheels and the ICE drives a different set.

Other, more useful, configurations have developed. For example, a Series Hybrid Electric Vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A Parallel Hybrid Electrical Vehicle (PHEV) configuration has an engine (most typically an ICE) and an electric motor that work together in varying degrees to provide the necessary wheel torque to drive the vehicle. Additionally, in the PHEV configuration, the motor can be used as a generator to charge the battery from the power produced by the ICE.

A Parallel/Series Hybrid Electric Vehicle (PSHEV) has characteristics of both PHEV and SHEV configurations and is sometimes referred to as a "powersplit" configuration. In one of several types of PSHEV configurations, the ICE is mechanically coupled to two electric motors in a planetary gear-set transaxle. A first electric motor, the generator, is connected to a sun gear. The ICE is connected to a carrier. A second electric motor, a traction motor, is connected to a ring (output) gear via additional gearing in a transaxle. Engine torque can power the generator to charge the battery. The generator can also contribute to the necessary wheel (output shaft) torque if the system has a one-way clutch. The traction motor is used to contribute wheel torque and to recover braking energy to charge the battery. In this configuration, the generator can selectively provide a reaction torque that may be used to control engine speed. In fact, the engine, generator motor and traction motor can provide a continuous variable transmission (CVT) effect. Further, the HEV presents an opportunity to better control engine idle speed over conventional vehicles by using the generator to control engine speed.

The desirability of combining an ICE with electric motors is clear. There is great potential for reducing vehicle fuel consumption and emissions with no appreciable loss of vehicle performance or drivability. The HEV allows the use of smaller engines, regenerative braking, electric boost, and even operating the vehicle with the engine shut down. Nevertheless, new ways must be developed to optimize the HEV's potential benefits.

One such area of HEV development is HEV engine operations. In an HEV, the engine has many functions. Its primary function is to provide drive torque. Other functions can include the following: charging the battery, purging a vapor canister, learning the shifts in the fuel delivery system to an adaptive fuel table, powering an air conditioning ("A/C") compressor if the compressor is mechanically driven by a front end accessory drive (FEAD) belt, replenishing vacuum to a vacuum reservoir, maintaining catalyst temperature (for optimal emissions), and maintaining engine temperature (for climate control system to provide heat to the passenger compartment). While performing these functions, the HEV engine must optimize emissions and fuel consumption without negatively impacting drivability and performance.

One of the techniques available in an HEV to reduce emissions and fuel consumption is to turn the engine off when it is not needed. If the engine is not running, the electric motor provides the required driving torque.

When running, the engine is used in both drive and vehicle idle conditions. Idle conditions exist when the vehicle is not moving. In an HEV, the engine is generally and ideally off during idle conditions. However, some HEV functions require the engine to remain on even in vehicle idle conditions. One such function can be the maturing of an HEV engine's adaptive fuel table. Adaptive fuel tables are known in the prior art to optimize emissions from internal combustion engines. See generally, Fuel Controller with an Adaptive Adder, U.S. Pat. No. 5,464,000 to Pursifull, et al. (Ford Motor Company).

As discussed in this referenced patent and known in the prior art, electronic fuel control systems are used predominantly today in most vehicles. The fuel controller systems vary the amount of fuel delivered to the engine cylinders based on the engine speed, mass airflow rate, and the oxygen content of the exhaust. These fuel controllers typically try to maintain the ratio of air and fuel at or near stoichiometry (considered to be approximately 14.6:1 A/F ratio for most types of gasoline) by implementing a closed loop fuel controller. Maintaining A/F at or near stoichiometry allows the catalytic converter to convert the exhaust gas into clean byproducts at an optimal level.

A typical prior art closed loop fuel controller determines the proper amount of fuel to deliver to the engine cylinders as follows. First, the airflow entering the engine is measured and then converted to an estimate of the amount of air charge entering each cylinder. This estimate is then modified by the concentration of oxygen in the exhaust gas (as measured by an exhaust gas oxygen (EGO) sensor). The oxygen content of the exhaust gas directly reflects the A/F ratio of the previous combustion event so that, if the A/F ratio was not near stoichiometry, a correction factor can be applied to the fuel amount delivered for the next combustion event. For example, if the EGO indicates a rich A/F mixture (less then stoichiometry), then the fuel amount will be reduced for the next combustion event. If the EGO indicates a lean A/F mixture, then the fuel amount will be increased for the next combustion event.

The adaptive fuel control feature, as discussed in the referenced patent and known in the prior art, enhances the closed loop fuel controller by learning the long-term "shifts" in the fuel delivery system. The amount of fuel required during closed loop fuel operation varies from engine to engine within a given engine configuration. The variation is due to differences in fuel system components such as fuel injectors and mass airflow sensors, the different degrees to which these components age, and the conditions under which the vehicle is driven. The adaptive fuel controller "learns" these long-term fuel adjustments for the many combinations of engine speed and engine air charge (or airflow) that can occur in the operation of an engine. The adaptive fuel controller learns a fuel shift if the actual A/F ratio is outside of a calibratable range relative to stoichiometry. The amount of the adjustment learned is proportional to how far from stoichiometry the actual A/F was and how quickly the gains used for adaptive corrections are calibrated. These learned or "adapted" adjustments in A/F are then stored in an adaptive fuel table for future use by the closed loop fuel controller when those same engine speed and air charge conditions are encountered again. Once the actual A/F returns to stoichiometry, the adaptive fuel cell is considered to be "mature".

The adaptive fuel table is a KAM (keep alive memory) type table. There are many different types of adaptive fuel tables. One type uses a matrix and a number of columns for engine speed on the x-axis and a number of rows for airflow on the y-axis. Another method uses engine "load" instead of airflow. Load is a normalized engine air charge defined as the current amount of air charge inducted into the cylinder divided by the maximum amount of air charge possible at that given engine speed. Yet another method uses the airflow dimension only and disregards the effect of engine speed. Regardless of the adaptive fuel table used, the result is the same. When the system is "adapting" to a particular airflow cell, the cell is updated with the air/fuel shift amount. That amount is used the next time the system is at that airflow point.

According to the Ford Motor Company prior art engine calibration guidelines, a vehicle will likely produce more repeatable low emission amounts and meet federal emissions standards if the air and fuel system shifts are learned or adapted before an official FTP (Federal Test Procedure) emissions test. Since only one preparatory ("prep") cycle is allowed before the FTP the system must learn all the air and fuel system shifts in its adaptive fuel tables during the one prep cycle.

Adaptive fuel table strategies in the prior art operate while the engine is running because they need to spend a period of time at a given airflow condition in order to adapt the fuel shift to the appropriate fuel cell in the table until that cell is "mature". Adaptive fuel strategies typically do not run while the vapor canister is being purged or while some on-board diagnostic monitors are running. Therefore, adaptive fuel, purge, and monitoring strategies tend to compete for engine running time to accomplish their tasks. This situation is exacerbated in an HEV because the vehicle's ICE is not always on. Therefore, the HEV's ability to quickly mature its adaptive fuel table is diminished. A new method and system for an HEV to quickly learn the adaptive fuel table must be developed.

SUMMARY OF THE INVENTION

Accordingly, an object of the present invention is to provide a method of maturing the adaptive fuel table within one FTP (Federal Test Procedure) emissions test preparatory cycle for a hybrid electric vehicle (HEV).

It is a further object of the present invention to provide a method of maturing the adaptive fuel table within one FTP (Federal Test Procedure) emissions test preparatory cycle for a hybrid electric vehicle (HEV).

Other objects of the present invention will become more apparent to persons having ordinary skill in the art to which the present invention pertains from the following description taken in conjunction with the accompanying figures.

BRIEF DESCRIPTION OF THE FIGURES

The foregoing objects, advantages, and features, as well as other objects and advantages, will become apparent with reference to the description and figures below, in which like numerals represent like elements and in which:

FIG. 4 illustrates an example of an adaptive fuel table.

DETAILED DESCRIPTION OF THE PREFERRED EMBODIMENT

Figure 1:
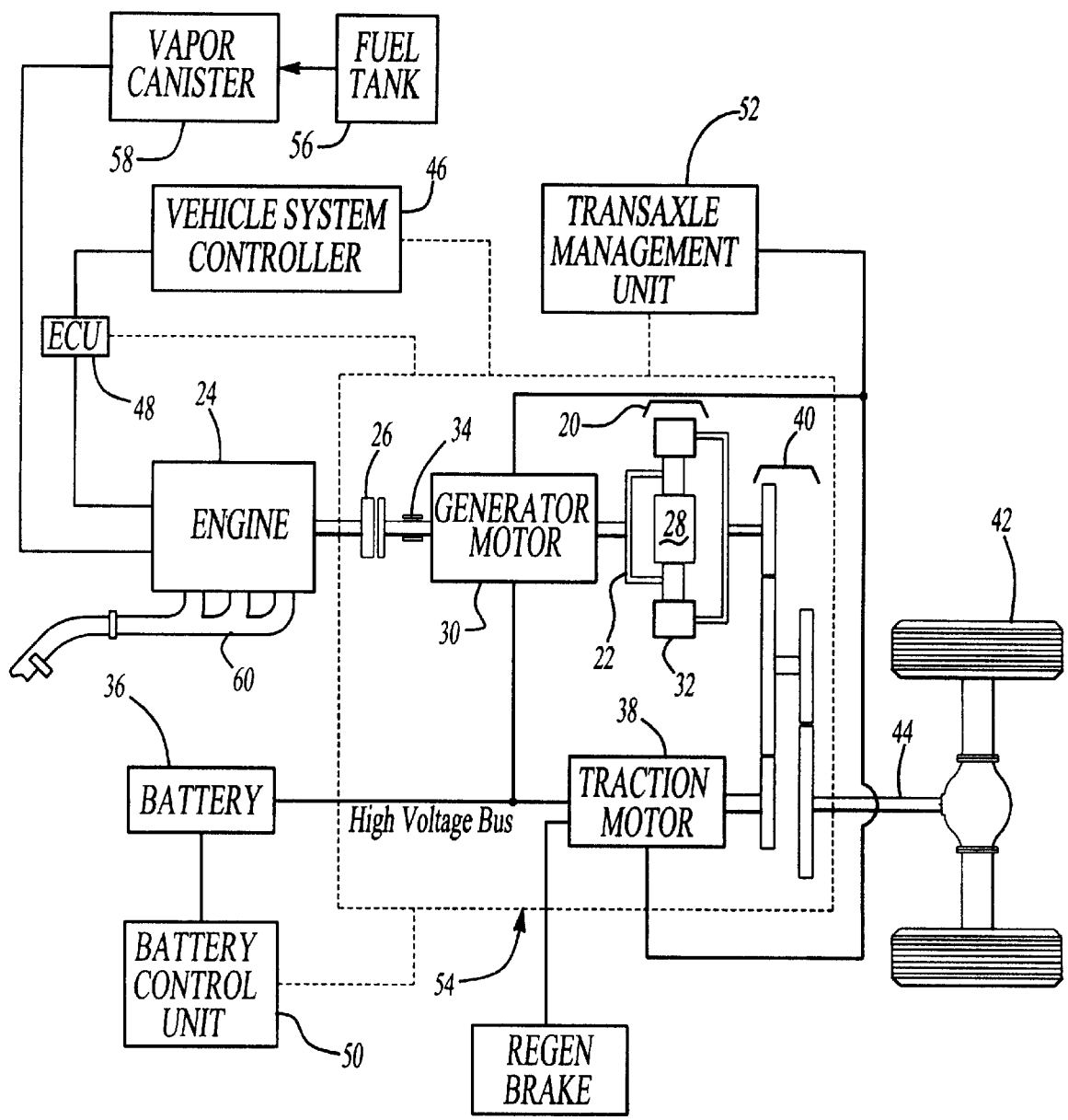
FIG. 1 illustrates a general hybrid electric vehicle (HEV) configuration.

The present invention relates to Electric Vehicles and, more particularly, Hybrid Electric Vehicles (HEVs). FIG. 1 demonstrates just one possible configuration, specifically a Parallel/Series Hybrid Electric Vehicle (powersplit) configuration.

In a basic powersplit HEV, a Planetary Gear Set 20 mechanically couples a Carrier Gear 22 to an Engine 24 via a One Way Clutch 26. The Planetary Gear Set 20 also mechanically couples a Sun Gear 28 to a Generator Motor 30 and a Ring (output) Gear 32. The Generator Motor 30 also mechanically links to a Generator Brake 34 and is electrically linked to a Battery 36. A Traction Motor 38 is mechanically coupled to the Ring Gear 32 of the Planetary Gear Set 20 via a Second Gear Set 40 and is electrically linked to the Battery 36. The Ring Gear 32 of the Planetary Gear Set 20 and the Traction Motor 38 are mechanically coupled to Drive Wheels 42 via an Output Shaft 44.

The Planetary Gear Set 20, splits the Engine 24 output energy into a series path from the Engine 24 to the Generator Motor 30 and a parallel path from the Engine 24 to the Drive Wheels 42. Engine 24 speed can be controlled by varying a split to the series path while maintaining a mechanical connection through the parallel path. The Traction Motor 38 augments the Engine 24 power to the Drive Wheels 42 on the parallel path through the Second Gear Set 40. The Traction Motor 38 also provides the opportunity to use energy directly from the series path, essentially running off power created by the Generator Motor 30. This reduces losses associated with converting energy into and out of chemical energy in the Battery 36 and allowing all Engine 24 energy, minus conversion losses, to reach the Drive Wheels 42.

A Vehicle System Controller (VSC) 46 controls many components in this HEV configuration by connecting to each component's controller. An Engine Control Unit (ECU) 48 connects to the Engine 24 via a hardwire interface. The ECU 48 and VSC 46 can be based in the same unit, but are actually separate controllers. The VSC 46 communicates with the ECU 48, as well as a Battery Control Unit (BCU) 50 and a Transaxle Management Unit (TMU) 52 through a communication network such as a Controller Area Network (CAN) 54. The BCU 50 connects to the Battery 36 via a hardwire interface. The TMU 52 controls the Generator Motor 30 and Traction Motor 38 via a hardwire interface.

The main function of the ECU 48 in this HEV system is to operate the Engine 24 in a manner that delivers requested Engine 24 torque by the VSC 46 in a manner that minimizes exhaust emissions and fuel consumption. This is accomplished partly through the ECU 48 control of the air/fuel ratio, including the use of an adaptive fuel control strategy.

Figure 2:
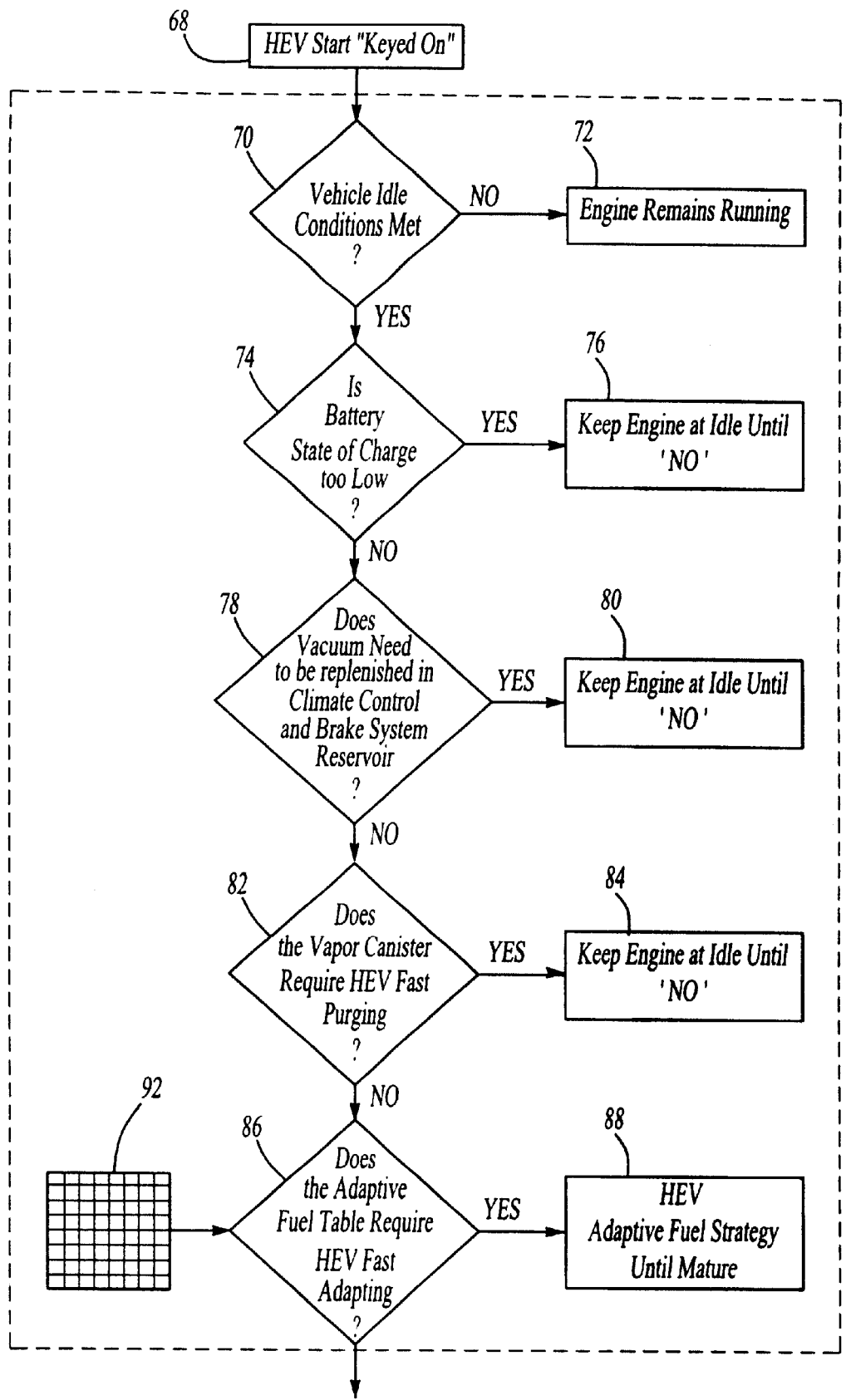
FIG. 2 illustrates a partial and simplified schematic diagram of an HEV idle mode flow chart for an HEV.

Because conventional adaptive fuel strategies compete with vapor canister, purge control and diagnostic monitoring strategies for engine running time to accomplish their tasks, and because the Engine 24 is not "on" all the time during a given HEV drive cycle not as many opportunities exist to mature an adaptive fuel table as in a conventional vehicle. Therefore, one of the key enablers for maintaining good A/F control in the HEV is the implementation of an HEV Adaptive Fuel Strategy 88 (FIG. 2). The present invention provides a method and system to mature an HEV's Adaptive Fuel Table 92 as quickly into a new drive cycle as possible where the new drive cycle is initiated with a "key on" start following a vehicle inactive, or "key off", period.

FIG. 2 is a partial and simplified flow chart of a possible Engine 24 "on" idle arbitration method, located inside the VSC 46. The HEV Engine 24 "on" idle arbitration method is the subject of Ford Global Technologies, Inc. Patent Application filed Nov. 14, 2000, Ser. No. 09/712,436. The purpose of such a method is to determine if the Engine 24 needs to be running at a vehicle idle condition, and if so, for what purpose. The method then can initiate different actions from the Engine 24 (and/or other HEV components) based on the reason for Engine 24 to be running.

One such reason to keep an engine 24 running (and is the subject of the present invention) is the need to mature the Adaptive Fuel Table 92. FIG. 2 demonstrates just one possible sequence of steps and, for illustrative purposes only, it only shows steps prior to the determination of whether the Adaptive Fuel Table 92 (FIG. 4) needs to be updated.

During the course of a drive cycle (key "on" 68 to key "off"), the vehicle will go into an idle condition once vehicle idle entry conditions are met at Step 70. For instance, the vehicle checks for low vehicle speed and accelerator position at Step 70. If vehicle idle conditions are not met, the vehicle remains in the current drive mode at Step 72.

If vehicle idle conditions are met, the VSC 46 determines if any vehicle operations require the Engine 24 to remain running during vehicle idle mode. If not, the Engine 24 may be shut down. At Step 74, the VSC 46 determines whether Battery 36 state of charge ("SOC") is too low. If the SOC is lower than a calibratable threshold level, the VSC 46 commands the Engine 24 to remain on during idle mode at Step 76 and initiates other actions to handle this task.

If the Battery 36 SOC is not too low, the VSC 46 proceeds to Step 78 and determines whether the vacuum needs to be replenished in a vehicle's climate control and brake system reservoir. If the vacuum needs to be replenished, the VSC 46 commands the Engine 24 to remain on during idle at Step 80 and initiates other actions to handle this task.

If the reservoir vacuum does not need to be replenished, the VSC 46 moves to step 82 and determines if a Vapor Canister 58 (FIG. 1) requires purging. If the Vapor Canister 58 requires purging the VSC 46 commands the Engine 24 to remain on during idle at Step 84 and initiates other actions to handle this task. If the Vapor Canister 58 does not need to be purged the VSC 46 moves to step 86 to determine if the Adaptive Fuel Table 92 has reached a mature state for this drive cycle.

The Adaptive Fuel Table 92 provides this maturity determination at Step 86. At each key "on" 68 (new drive cycle), a flag called HEV_ADAPT_DONE is initialized to 0 (indicating the HEV adaptive fuel routine has not been completed for this drive cycle) and a pointer called ADAPT_CELL_PTR is initialized to 1 (referencing the first airflow cell of the Adaptive Fuel Table 92). Step 86 determines whether the HEV_ADAPT_DONE flag=0 (table is not mature) and whether other standard conditions for adapting the fuel tables, as are known in the prior art, have been met (such as the engine having reached its stabilized operating temperature).

Generally, if HEV_ADAPT_DONE=0 in Step 86, and the other standard Adaptive Fuel Strategy 88 conditions have been met, the VSC 46 commands the Engine 24 to remain "on" at idle and initiates the HEV Adaptive Fuel Strategy 88 (inside the ECU 48 or VSC 46) at Step 88. This strategy is the subject matter for the present invention and the preferred embodiment is illustrated in FIG. 3.

Figure 3:
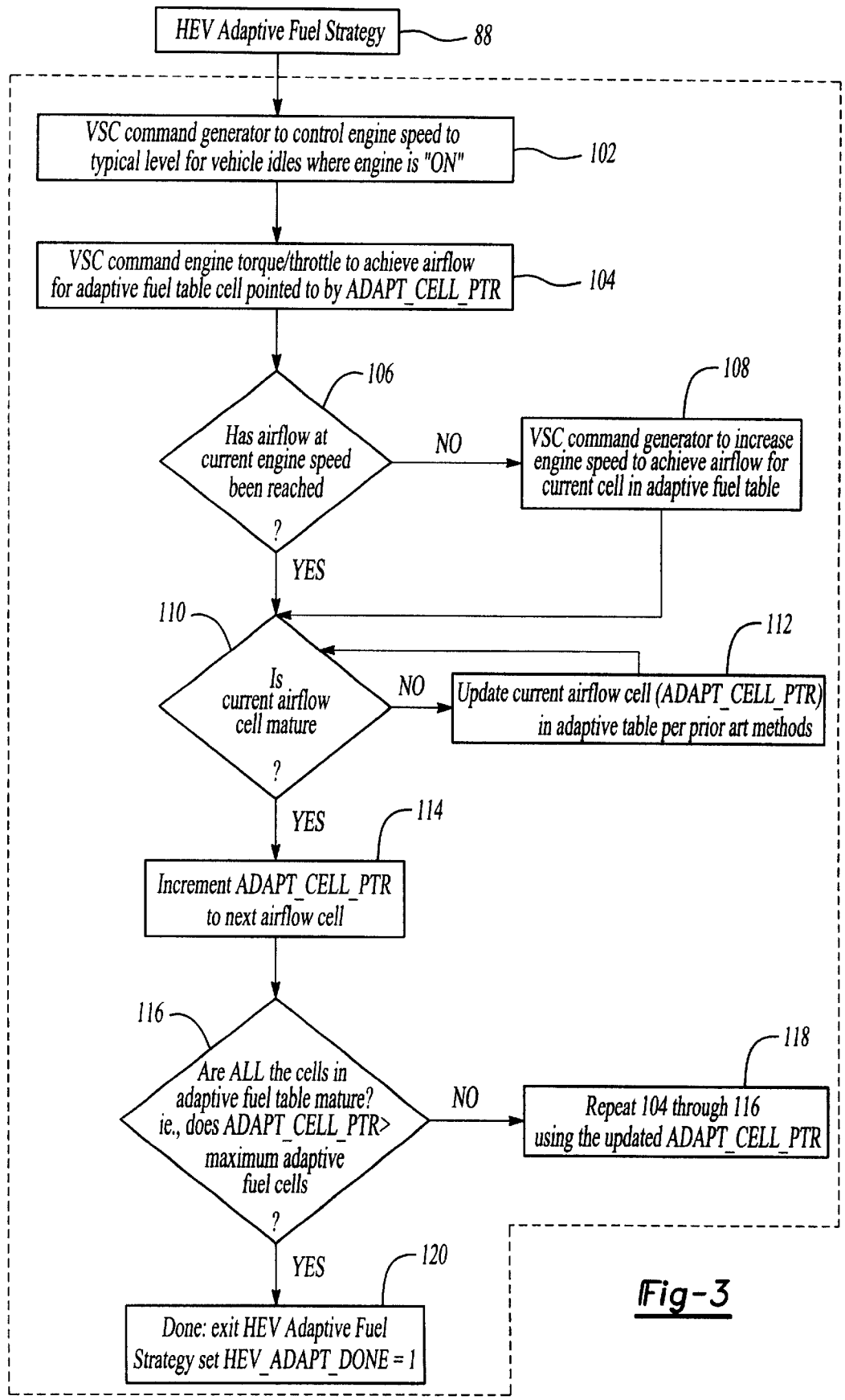
FIG. 3 illustrates a schematic diagram of the HEV adaptive fuel strategy for an HEV.

The HEV Adaptive Fuel Strategy 88 illustrated more completely in FIG. 3, uses vehicle idle modes early in the drive cycle to force the Engine 24 to operate at airflow conditions used as reference cells in the Adaptive Fuel Table 92, thereby maturing the Adaptive Fuel Table 92 more quickly.

As indicated in FIG. 2, a key "on" 68 initiates a new drive cycle, the VSC 46 strategy checks every vehicle idle mode at Step 86 to see if HEV_ADAPT_DONE=0 and whether other HEV Adaptive Fuel Strategy 88 conditions are met. For instance, the VCS 46 strategy monitors whether the Engine 24 has reached a stabilized operating temperature. If these HEV Adaptive Fuel Strategy 88 conditions are met, the VSC 46 invokes the HEV Adaptive Fuel Strategy 88 shown in FIG. 3.

At Step 102 of the HEV Adaptive Fuel Strategy 88, the VSC 46 commands the Generator Motor 30 to control the Engine 24 speed at a typical speed used when the engine is "on" during vehicle idle modes (i.e., an idle speed). This allows use of the typical idle speed to sweep through the airflow cells in the Adaptive Fuel Table 92 (shown more specifically in FIG. 4) so that a driver's perception of Engine 24 speed when the vehicle is at idle will not be disrupted.

Next, at Step 104, the VSC 46 commands the Engine 24 to run at a brake torque level that represents a certain throttle position to achieve the Engine 24 airflow specified by ADAPT_CELL_PTR. For example, in FIG. 4, if ADAPT_CELL_PTR=1, the Adaptive Fuel Strategy 88 points to the first adaptive fuel table row 130, and corresponds to an airflow of 1.0 lbs/min. Thus, the VSC 46 would control the Engine 24 torque in order to achieve 1.0 lbs/min of airflow and update that particular airflow cell of the Adaptive Fuel Table 92. The Adaptive Fuel Strategy 88 requires an electronic throttle controller (not shown in FIG. 1) to perform a torque-based Engine 24 control strategy. This type of control strategy converts a desired Engine 24 torque into an equivalent throttle position.

Next, Step 106 checks whether Engine 24 throttle has enough range of authority to deliver the desired airflow for the current Engine 24 speed. Most engines are able to achieve higher airflows for the same throttle position if the engine speed is raised. Thus, if the Engine 24 throttle has reached its maximum position, and the desired airflow for the given adaptive fuel cell has not been achieved, the strategy moves to Step 108 where the VSC 46 commands the Generator Motor 30 to increase the Engine 24 speed until the desired airflow is reached.

Whether the desired airflow is achieved by increasing the Engine 24 torque/throttle at Step 104 or Engine 24 speed at Step 108, the next Step 110 determines whether that particular airflow cell is mature (as determined by prior art methods). If not mature, then prior art adaptive fuel strategies can be used to update that cell until it is mature at Step 112.

Once the current airflow cell is mature, the ADAPT_CELL_PTR parameter is incremented by one in Step 114, thus pointing to the next airflow cell in the Adaptive Fuel Table 92 (For example, as shown in FIG. 4, the next cell would be in table row 132). Next, in Step 116, the strategy determines whether all of the airflow cells in the Adaptive Fuel Table 92 have been matured. In this example, this is accomplished by using a check such as "is the ADAPT_CELL_PTR value greater than the maximum number of airflow cells defined in the Adaptive Fuel Table 92"? If yes, then the logic moves to Step 120, and indicates the end of the HEV Adaptive Fuel Strategy 88 by setting the flag HEV_ADAPT_DONE =1. If no, the Adaptive Fuel Strategy 88 repeats steps 104 through 116 using the new airflow cell represented by ADAPT_CELL_PTR until all the cells in the Adaptive Fuel Table 92 are reached.

Once HEV_ADAPT_DONE =1, the HEV Adaptive Fuel Strategy 88 will never be invoked by the VSC 46 for future vehicle idle modes in the current drive cycle (FIG. 2). Also, if the HEV Adaptive Fuel Strategy 88 is in the middle of updating the airflow cells and a condition occurs that requires the strategy to stop (such as the vehicle is no longer in an idle mode, or the Vapor Canister 58 requires purging), the HEV Adaptive Fuel Strategy 88 will remember the airflow cell it was last updating via ADAPT_CELL_PTR. For example, if at one vehicle idle mode the HEV Adaptive Fuel Strategy 88 got through 2 of the 6 cells in the Adaptive Fuel Table 92, and then the driver pressed the accelerator to leave the idle mode, then the HEV Adaptive Fuel Strategy 88 would exit with HEV_ADAPT_DONE still=0 but would have ADAPT_CELL_TMR=3. Thus, the next time a vehicle idle condition occurred, the HEV Adaptive Fuel Strategy 88 would begin updating cell 3 of 6 and continue on in this manner until all the cells were mature and HEV_ADAPT_DONE =1.

This HEV Adaptive Fuel Strategy 88 is not intended to replace a conventional prior art adaptive fuel strategy, but rather to work with an existing one. Outside of the HEV Adaptive Fuel Strategy 88, the conventional prior art adaptive fuel strategy can work in its normal manner to check the different airflow cells of the table as they are encountered when the engine is running in various drive modes. The purpose of the HEV Adaptive Fuel Strategy 88 is to provide a quick way to achieve a mature Adaptive Fuel Table in the span of one FTP preparatory drive cycle, thereby ensuring robust tailpipe emissions during the FTP emissions test.

The above-described embodiment of the invention is provided purely for purposes of example. Many other variations, modifications, and applications of the invention may be made.

We claim:

1. A system to mature adaptive fuel tables for a hybrid electric vehicle comprising:
    means for determining that an adaptive fuel table is not mature;
    means for determining that an adaptive fuel strategy is allowed under a system idle arbitration logic to mature the adaptive fuel table;
    means for ordering an engine throttle to sweep through different airflow regions of an engine;
    means for collecting fuel shift data from a plurality of engine sensors during the throttle sweep until the adaptive fuel strategy orders data collection to stop; and
    means for adapting the fuel shift data from engine throttle sweep data in the adaptive fuel table.

2. The system of claim 1, wherein the means for determining that an adaptive fuel strategy is allowed under the system idle arbitration logic comprises:
    means for determining that engine idle conditions are met;
    means for determining that engine operation is necessary;
    means for determining that a battery state of charge is not too low;
    means for determining that a vacuum does not need to be replenished in a climate control and brake system reservoir; and
    means for determining that a system vapor canister does not require HEV-fast purging.

3. The system of claim 1, wherein means for ordering an engine throttle to sweep comprises an order to move the throttle to a next higher throttle position/airflow cell in the adaptive fuel table.

4. The system of claim 1, wherein the order to stop data collection comprises signaling that all fuel shifts for all airflow cells have finished adapting, whereby the adaptive fuel table is considered mature.

5. The system of claim 1, wherein the means for ordering an engine throttle to sweep further comprises means for ordering torque added to hold the engine at a constant speed during the engine throttle sweep whereby overall desired torque remains constant.

6. The system of claim 1, wherein the means for ordering an engine throttle to sweep further comprises means for ordering torque subtracted to hold the engine at a constant speed during the engine throttle sweep whereby overall desired torque remains constant.

7. The system of claim 5, wherein means for ordering torque added comprises means for ordering a generator to connect to the engine to hold the engine at a constant speed whereby overall desired torque remains constant.

8. The system of claim 6, wherein means for ordering torque subtracted comprises means to order a generator to connect to the engine to hold the engine at a constant speed whereby overall desired torque remains constant.

9. A method to mature adaptive fuel tables for a hybrid electric vehicle comprising the steps of:
    determining through a controller whether the adaptive fuel table is not mature;
    determining that an adaptive fuel strategy is allowed under a system idle arbitration logic to mature the adaptive fuel table;
    ordering an engine throttle to sweep through different airflow regions of an engine;
    collecting fuel shift data from engine sensors during the throttle sweep until the adaptive fuel strategy orders data collection to stop; and
    adapting fuel shift data from an engine throttle sweep data in the adaptive fuel table.

10. The method of claim 9, wherein determining whether the adaptive fuel strategy is allowed under the system idle arbitration logic comprises:
    determining that engine idle conditions are met; determining engine operation is necessary;
    determining that a battery state of charge is not too low;
    determining that a vacuum does not need to be replenished in a climate control and brake system reservoir; and
    determining that a system vapor canister does not require HEV-fast purging.

11. The method of claim 9, wherein ordering the engine throttle to sweep comprises the step of moving the throttle to a next higher throttle position/airflow cell in the adaptive fuel table.

12. The method of claim 9, wherein ordering to stop data collection comprises signaling from the controller that all fuel shifts for all airflow cells have finished adapting, whereby the adaptive fuel table is considered mature.

13. The method of claim 9, wherein ordering the engine throttle to sweep further comprises the, step of ordering an addition of torque to the engine to hold the engine at a constant speed during the engine throttle sweeping whereby overall desired torque remains constant.

14. The method of claim 9, wherein ordering the engine throttle to sweep further comprises the step of ordering a subtraction of torque to the engine to hold the engine at a constant speed during the engine throttle sweeps whereby overall desired torque remains constant.

15. The method of claim 13, wherein adding torque comprises ordering a generator to connect to the engine and holding the engine at a constant speed whereby overall desired torque remains constant.

16. The method of claim 14, wherein ordering the subtraction of torque comprises ordering a generator to connect to the engine to hold the engine at a constant speed whereby overall desired torque remains constant.

17. An article of manufacture to mature adaptive fuel tables for a hybrid electric vehicle comprising:

a controller; and a control program embodied within the controller for determining that an adaptive fuel table is not mature, determining that an adaptive fuel strategy is allowed under a system idle arbitration logic to mature the adaptive fuel table, ordering an engine throttle to sweep-through different airflow regions of an engine, collecting fuel shift data from a plurality of engine sensors during the throttle sweep until the adaptive fuel strategy orders data collection to stop, and adapting the fuel shift data from engine throttle sweep data in the adaptive fuel table.

* * * * *